(12) United States Patent
Bieganek et al.

(10) Patent No.: US 11,494,530 B2
(45) Date of Patent: **\*Nov. 8, 2022**

(54) SOLAR FARM DESIGN SYSTEM

(71) Applicant: Inventus Holdings, LLC, Juno Beach, FL (US)

(72) Inventors: Cameron L. Bieganek, Minneapolis, MN (US); Taran Raj, St. Paul, MN (US); Ryan R. Butterfield, Farmington, MN (US); Francisco J. Guzman, Eagan, MN (US); Jared R. Gommels, Edina, MN (US); Justin R. Newcom, Brooklyn Park, MN (US); Nathan S. Donst, St. Paul, MN (US); Stacy A. Fleenor, Eagan, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/926,141

(22) Filed: Jul. 10, 2020

(65) Prior Publication Data

US 2020/0342147 A1 Oct. 29, 2020

Related U.S. Application Data

(63) Continuation of application No. 15/625,389, filed on Jun. 16, 2017, now Pat. No. 10,776,531.

(51) Int. Cl.
*G06F 30/18* (2020.01)
*H02S 40/32* (2014.01)
(Continued)

(52) U.S. Cl.
CPC .............. *G06F 30/18* (2020.01); *G06F 30/13* (2020.01); *H02S 10/00* (2013.01); *H02S 40/30* (2014.12);
(Continued)

(58) Field of Classification Search
CPC ...... G06F 30/13; G06F 30/18; G06F 2119/06; H02S 40/30; H02S 40/32; H02S 10/00; H02J 2203/20
(Continued)

(56) References Cited

U.S. PATENT DOCUMENTS 6,546,535 B1  4/2003  Nagao et al.
7,500,391 B2  3/2009  Woro
(Continued)

*Primary Examiner* — Andre Pierre Louis
(74) *Attorney, Agent, or Firm* — Tarolli, Sundheim, Covell & Tummino LLP

(57) ABSTRACT

One example includes a method for generating a solar farm design. Geographic map data defines geographic features and boundaries of a geographic region. A solar panel block library that stores virtual solar panel block types is accessed. Each of the virtual solar panel block types corresponds to a design of a respective solar panel block that includes solar panels, an inverter, and an access road, and each virtual solar panel block type includes predetermined dimensions and a predefined output power rating. An array of a virtual solar panel block type to fit within the geographic features and boundaries of the geographic region on the map is generated based on the dimensions of each of the virtual solar panel blocks in the array. The array is iteratively modified to optimize a criterion of the solar farm design, and the design is stored in a memory for subsequent solar farm installation.

20 Claims, 7 Drawing Sheets

(51) Int. Cl.
*H02S 40/30* (2014.01)
*H02S 10/00* (2014.01)
*G06F 30/13* (2020.01)
*H02J 3/38* (2006.01)
*G06F 119/06* (2020.01)

(52) U.S. Cl.
CPC .......... *H02S 40/32* (2014.12); *G06F 2119/06* (2020.01); *H02J 3/38* (2013.01); *H02J 3/383* (2013.01); *H02J 2203/20* (2020.01)

(58) Field of Classification Search
USPC ....................................................... 703/1, 18
See application file for complete search history.

(56) References Cited

U.S. PATENT DOCUMENTS

| | | | |
|---|---|---|---|
| 2008/0105045 A1 | 5/2008 | Woro | |
| 2009/0234692 A1 | 9/2009 | Powell et al. | |
| 2010/0000596 A1 | 1/2010 | Mackler | |
| 2011/0295575 A1 | 12/2011 | Levine et al. | |
| 2013/0246010 A1 | 9/2013 | Dershowitz et al. | |
| 2014/0306533 A1* | 10/2014 | Paquin | H02J 3/46 307/43 |
| 2015/0066442 A1* | 3/2015 | Pryor | G06F 30/20 136/251 |
| 2015/0331972 A1* | 11/2015 | McClure | G06F 17/11 703/2 |
| 2018/0365352 A1 | 12/2018 | Bieganek et al. | |

\* cited by examiner

```
550 ─┐
     │
                                                              ┌─ 552
     ┌──────────────────────────────────────────────────────────┐
     │ RECEIVE GEOGRAPHIC MAP DATA COMPRISING A MAP THAT DEFINES │
     │ GEOGRAPHIC FEATURES AND BOUNDARIES OF A GEOGRAPHIC REGION │
     │ ON WHICH A SOLAR FARM IS TO BE INSTALLED BASED ON THE     │
     │ SOLAR FARM DESIGN                                         │
     └──────────────────────────────────────────────────────────┘
                              │
                              ▼                               ┌─ 554
     ┌──────────────────────────────────────────────────────────┐
     │ ACCESS A SOLAR PANEL BLOCK LIBRARY THAT IS CONFIGURED TO  │
     │ STORE A PLURALITY OF VIRTUAL SOLAR PANEL BLOCK TYPES      │
     └──────────────────────────────────────────────────────────┘
                              │
                              ▼                               ┌─ 556
     ┌──────────────────────────────────────────────────────────┐
     │ GENERATE AN ARRAY OF VIRTUAL SOLAR PANEL BLOCKS COMPRISING│
     │ AT LEAST ONE OF THE PLURALITY OF VIRTUAL SOLAR PANEL BLOCK│
     │ TYPES TO FIT WITHIN THE GEOGRAPHIC FEATURES AND BOUNDARIES│
     │ OF THE GEOGRAPHIC REGION ON THE MAP BASED ON THE          │
     │ PREDETERMINED DIMENSIONS OF EACH OF THE VIRTUAL SOLAR     │
     │ PANEL BLOCKS IN THE ARRAY                                 │
     └──────────────────────────────────────────────────────────┘
                              │
                              ▼                               ┌─ 558
     ┌──────────────────────────────────────────────────────────┐
     │ ITERATIVELY MODIFY THE ARRAY TO SUBSTANTIALLY OPTIMIZE A  │
     │ PREDETERMINED CRITERION OF THE SOLAR FARM DESIGN          │
     └──────────────────────────────────────────────────────────┘
                              │
                              ▼                               ┌─ 560
     ┌──────────────────────────────────────────────────────────┐
     │ STORE THE SOLAR FARM DESIGN IN A MEMORY FOR INSTALLATION  │
     │ OF THE SOLAR FARM BASED ON THE SOLAR FARM DESIGN          │
     └──────────────────────────────────────────────────────────┘
```

FIG. 13

SOLAR FARM DESIGN SYSTEM

This application is a continuation application of U.S. application Ser. No. 15/625,389 filed on Jun. 16, 2017, now U.S. Pat. No. 10,776,531, and entitled, Solar Design System, the entirety of which is incorporated herein by reference.

TECHNICAL FIELD

This disclosure relates generally to power design systems, and more specifically to a solar farm design system.

BACKGROUND

Renewable and natural energy sources are becoming more popular for generating power. Such renewable and natural energy sources are persistently available, require no fuel, generate no pollutants, and are more widely accepted in a more ecologically conscientious society. Such renewable and natural energy sources can be scaled to a great extent to provide renewable power plants. One such renewable power plant is a solar farm (i.e., solar park) that harnesses a large amount of solar energy to generate electricity for a public power grid to provide clean and renewable energy to a community. A solar farm can be implemented as a large-scale photovoltaic system that includes a large number of photovoltaic modules (i.e., solar panels) that convert light directly to electricity. By utilizing a very large number of solar panels, a solar farm can supply power at a utility level, rather than to a local user or users based on building-mounted and other decentralized solar power applications.

SUMMARY

One example includes a method for generating a solar farm design. Geographic map data defines geographic features and boundaries of a geographic region. A solar panel block library that stores virtual solar panel block types is accessed. Each of the virtual solar panel block types corresponds to a design of a respective solar panel block that includes solar panels, an inverter, and an access road, and each virtual solar panel block type includes predetermined dimensions and a predefined output power rating. An array of a virtual solar panel block type to fit within the geographic features and boundaries of the geographic region on the map is generated based on the dimensions of each of the virtual solar panel blocks in the array. The array is iteratively modified to optimize a criterion of the solar farm design, and the design is stored in a memory for subsequent solar farm installation.

Another example includes a computer readable medium comprising computer executable components. The computer executable components include geographic map data comprising a map that defines geographic features and boundaries of a geographic region on which a solar farm is to be installed. The computer executable components also include a solar panel block library configured to store a plurality of virtual solar panel block types. Each of the plurality of virtual solar panel block types corresponds to a design of a respective solar panel block comprising a plurality of solar panels, an inverter, and an access road. Each of the plurality of virtual solar panel block types includes predetermined dimensions and a predefined output power rating. The computer executable components further include a solar farm design controller configured to execute a solar farm design algorithm configured to generate an array of virtual solar panel blocks comprising at least one of the plurality of virtual solar panel block types to fit within the geographic features and boundaries of the geographic region on the map based on the predetermined dimensions of each of the virtual solar panel blocks in the array and to iteratively modifying the array to substantially maximize an output power rating of the solar farm design based on the predefined output power rating of each of the virtual solar panel blocks in the array relative to predetermined maintenance and installation costs associated with the solar farm. The solar farm design is stored in a memory for installation of the solar farm based on the solar farm design.

Yet another example includes a solar farm installed on a geographic region and coupled to an electric grid. The solar farm includes a plurality of non-identical parallel rows or columns. Each row or column includes a multiplicity of identical rectangular solar panel blocks. Each solar panel block includes a multiplicity of solar panels, an access road segment comprising two opposing sides and traversing through the respective solar panel block wherein at least a portion of each opposing side of the access road segment is adjacent to a respective portion of the multiplicity of solar panels, and an inverter coupled to the multiplicity of solar panels and the electric grid. The inverter includes a multiplicity of sides, with one of the multiplicity of sides being located adjacent to the access road segment and the remaining of the multiplicity of sides being located adjacent a respective portion of the multiplicity of solar panels. Each of the solar panel blocks of a first row or a first column of the parallel rows includes a first rectangular shape. Each of the solar panel blocks of a second row or a second column of the parallel rows or columns, respectively, includes a second rectangular shape different from the first rectangular shape.

BRIEF DESCRIPTION OF THE DRAWINGS

FIG. 13 illustrates a method for designing a solar farm.

DETAILED DESCRIPTION

Figure 1:
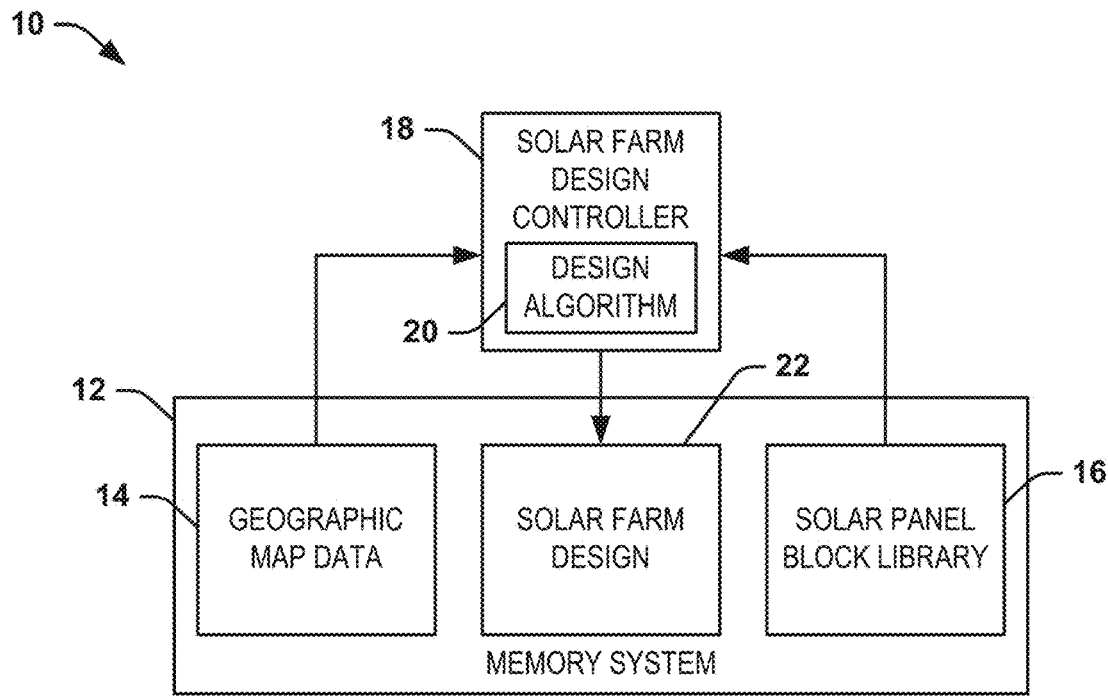
FIG. 1 illustrates an example of a solar farm design system.

This disclosure relates generally to power design systems, and more specifically to a solar farm design system. A solar farm design system can be configured to design a solar farm by implementing predetermined virtual solar panel block types and a solar farm design algorithm. The solar farm design system can access a solar panel block library that stores a plurality of different virtual solar panel block types. Each of the virtual solar panel block types can correspond to a design of a respective solar panel block that includes solar panels, an inverter, and an access road. Each of the virtual solar panel block types can also include data pertaining to, for example, precomputed dimensions, a predefined output power rating, and installation and maintenance considerations. As an example, solar panel block libraries, and the precomputed dimensions, can also be impacted by spacing between solar panel tables, orientation of solar panels, number of solar panels on a DC bus to deliver AC power, an angle of solar panel mounting tables to the sun, and other considerations. The solar farm design system can also access map data that can correspond to a map that defines boundaries and geographic features pertaining to a geographic region on which the solar farm is to be installed based on the solar farm design.

The solar farm design algorithm can be configured to generate an array of virtual solar panel blocks that fit within the geographic features and boundaries of the map associated with the geographic map data. For example, the solar farm design algorithm can iteratively select the virtual solar panel block types to overlay the array on the map, and can remove virtual solar panel blocks that intersect with the boundaries and geographic features, and can select a given one of the virtual solar panel block types that substantially optimize the solar farm design with respect to a predetermined criterion. As an example, the predetermined criterion can include maximization of output power of the solar farm design and/or installation and maintenance considerations and/or long-term financial performance. The solar farm design algorithm can also then iteratively shift the virtual solar panel blocks of at least one row or at least one column of the array to be able to fit an additional virtual solar panel block at an end of the respective row(s) or column(s). Furthermore, the solar farm design algorithm can iteratively change the dimensions of each of the virtual solar panel blocks in at least one of the rows or at least one of the columns, such as by selecting a next one of the virtual solar panel block types from the solar panel block library, to substantially maximize the area of the virtual solar panel blocks superimposed on the map. Accordingly, the solar farm design system can operate to substantially optimize the solar farm design based on maximizing output power relative to installation and maintenance costs.

The solar farm design algorithm can be configured to generate an array of virtual solar panel blocks that fit within the geographic features and boundaries of the map associated with the geographic map data, as explained previously. In addition, the solar farm design algorithm may be programmed to exclude areas that are not suitable for solar panel installation. For example, the solar farm design algorithm can iteratively select the virtual solar panel block types to overlay the array on the map, and can remove virtual solar panel blocks that intersect with the boundaries and other geographic features denoted as predetermined exclusion zones, and can select a given one of the virtual solar panel block types that substantially optimize the solar farm design with respect to a predetermined criterion.

FIG. 1 illustrates an example of a solar farm design system 10. The solar farm design system 10 can be implemented in the design of a solar farm that is configured to provide solar power to a power grid via a large number (e.g., thousands to multiple orders of magnitude more) of solar panels, such as for providing consumer electricity to a community or to provide large-scale electricity to a facility. As an example, the solar farm design system 10 is configured to optimize the design of the solar farm in a manner that balances output power, and thus possibly revenue generated, relative to the costs associated with installation and maintenance of the associated solar farm.

The solar farm design system 10 includes a memory system 12 that is configured to store geographic map data 14 and a solar panel block library 16. As an example, the memory system 12 can be configured as a single memory, a memory system on a computer, or as a distributed memory system associated with multiple computers. The geographic map data 14 can correspond to data associated with a map that includes information regarding geographic features and boundaries of a geographic region on which a solar farm is to be installed. As an example, the geographic map data 14 can define boundary or property lines, such as can be ascertained via a land survey or other manner, and can include data regarding the location of natural or man-made features on the geographic region, such as buildings, rock formations, bodies of water, or any of a variety of other features of the geographic region that can affect the location of installation of blocks of solar panels, as described in greater detail herein. As yet another example, the geographic map data 14 can include data associated with climate data, such as can be indicative of sunlight exposure to the geographic region, and thus can be associated with an expected output power of solar panels that are to be installed in the geographic region. Thus, the geographic map data 14 can be stored in the memory system 12 to be accessed to facilitate design of the solar farm on the geographic region represented by the map associated with the geographic map data 14.

The solar panel block library 16 is configured to store a plurality of different predetermined virtual solar panel block types. As described herein, the term "virtual solar panel block type" refers to a virtual arrangement of a portion of a solar farm, hereinafter referred to as a "solar panel block". Each of the virtual solar panel block types includes data regarding location, number, and characteristics of solar panels to be included in an associated solar panel block, and can also include a location, type, and characteristics of an inverter that is configured to couple the electricity generated by the solar panels into the electrical grid as AC power. Each of the solar panel block types can also include a location and dimensions of an access road associated with the corresponding solar panel block, with the access road being implemented for installation and maintenance of the solar panel block. Solar panel block libraries, and the precomputed dimensions, can also be impacted by spacing between solar panel tables, orientation of solar panels, number of panels on a DC bus to deliver AC power, angle of solar panel mounting tables to the sun, and/or other factors that can create a very large number of potential different solar panel blocks. Therefore, each of the different virtual solar panel types can correspond to a template for building and replicating the individual solar panel blocks that constitute individual discrete portions of the solar farm. The precomputed dimensions of the solar plant block library can be for any size or shape as so long as it meets predefined criteria for cost, power output, and/or physical characteristics.

Figure 2:
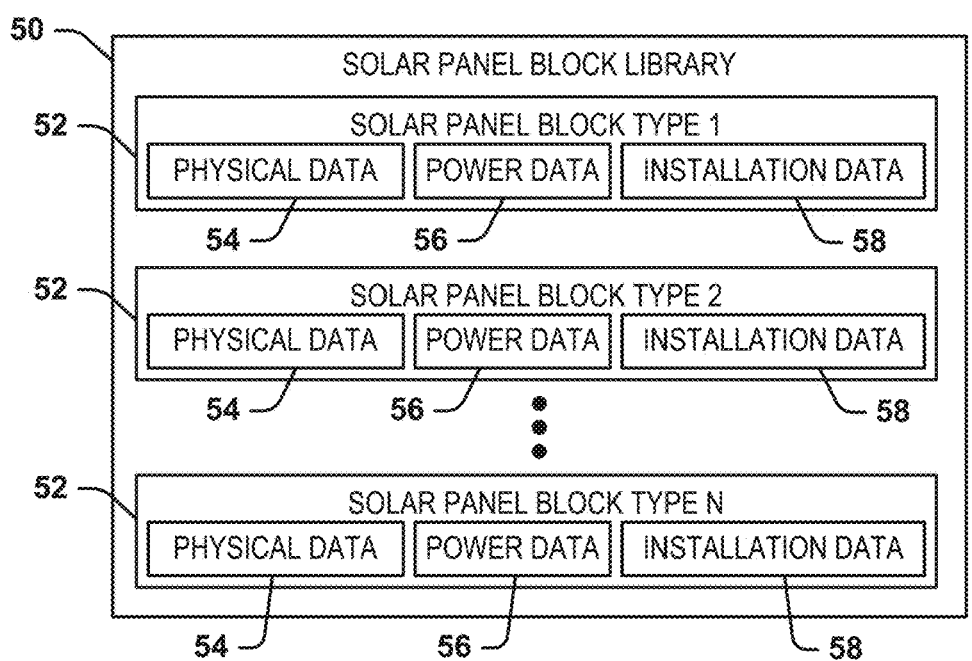
FIG. 2 illustrates an example of a solar panel block library.

FIG. 2 illustrates an example of a solar panel block library 50. The solar block library 50 can correspond to the solar block library 16 in the example of FIG. 1. Therefore, reference is to be made to the example of FIG. 1 in the following description of the example of FIG. 2.

The solar panel block library 50 includes a plurality N of predetermined solar panel block types 52, where N is a positive integer. Each of the solar panel block types 52 can be stored in the solar panel block library 50 as a data set that includes descriptive features of each of the respective solar panel block types 52. In the example of FIG. 2, the solar panel block types 52 include physical data 54, power data 56, and installation data 58. The physical data 54 can correspond to physical characteristics of the respective solar panel block type 52, including a quantity of solar panels and physical dimensions associated with the respective solar panel block type 52. For example, the physical dimensions in the physical data 54 can correspond to both real-world physical dimensions, as well as a graphical representation of the respective solar panel block type 52, as described in greater detail herein. Therefore, the graphical representation of the solar panel block types 52 can be implemented to superimpose a virtual version of the solar panel block type 52 on the map associated with the geographic map data 14, as described in greater detail herein.

The power data 56 associated with each of the solar panel block types 52 can include information regarding an output power associated with the respective solar panel block type 52. For example, the power data 56 can characterize the aggregate output power of the solar panels that constitute the respective solar panel block type 52. The power data 56 can also include climate data or climate considerations for the output power, such that the power data 56 can provide an average expected output power over time for the respective solar panel block type 52. The installation data 58 can include information regarding the installation costs and/or maintenance costs associated with the respective solar panel block type 52. For example, the installation data 58 can include the costs associated with the hardware of the respective solar panel block type 52, such as including the solar panels, the inverter, cables, conduit, junction boxes, etc., and can also include estimated man-hours associated with installation and maintenance over a predetermined duration of time. As an example, the duration of time can be approximately the same as the duration of time associated with the average output power defined by the power data 56.

Therefore, the solar panel block library 50 can be configured to store substantially all relevant data associated with each of the predetermined solar panel block types 52. The relevant data can thus be associated with design of the solar farm, as well as operational characteristics of the respective solar panel block types 52 operating in the solar farm. In addition, while the solar panel block library 50 is demonstrated as including the N solar panel block types 52, it is to be understood that the solar panel block library 50 can include dynamic entries for solar panel block types 52. As a result, additional solar panel block types 52 can be subsequently designed and stored in the solar panel block library 50, such as in response to advancements in solar panel technology, or based on variations or needs with respect to the geometry of the solar panel block types 52.

Figure 3:
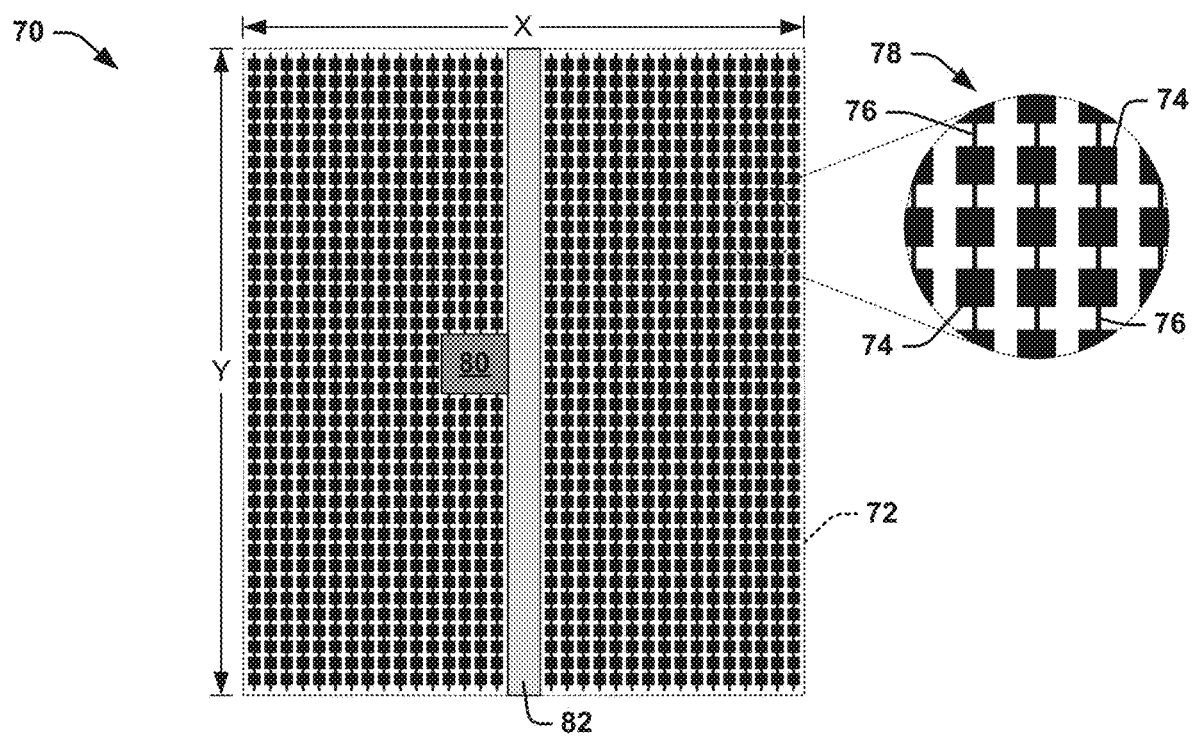
FIG. 3 illustrates an example diagram of a solar panel block.

FIG. 3 illustrates an example diagram 70 of a solar panel block 72. The solar panel block 72 can correspond to a given one of the solar panel block types 52 stored in the solar panel block library 50. Thus, the solar panel block 72 can correspond to a physical "real world" solar panel block that is installed in a solar farm, and which is based on design data associated with the respective solar panel block type 52 stored in the solar panel block library 50, such that the solar respective panel block type 52 describes substantially all aspects of the solar panel block 72.

The solar panel block 72 is demonstrated as including a large plurality of solar panels 74 that are electrically coupled together in series in strings 76, as demonstrated by the interconnection of the solar panels 74 in a magnified view 78 in the example of FIG. 3. Each of the solar panels 74 has a variety of physical and electrical features that can be described in the entry for the respective solar panel block type 52 in the solar panel block library 50. For example, each of the solar panels 74 can include a power rating, such that the aggregate power rating of the solar panels 74 in the solar panel block 72 can be described by the power data 56 in the respective solar panel block type 52. Additionally, the aggregate dimensions of the solar panels 74 and the strings 76 can be represented by the physical data 54 in the respective solar panel block type 52. In the example of FIG. 3, the solar panel block 72 is demonstrated as having dimensions of "X" by "Y" corresponding to the physical dimensions of the "footprint" of the solar panel block 72 in the respective geographic region of the solar farm, such as scores or hundreds of feet/meters. Furthermore, the physical data 54 can also describe physical aspects of the solar panels 74, such as including a respective tilt and/or orientation (e.g., to optimize sunlight) or whether the solar panels 74 are fixed or having solar tracking capability.

The solar panel block 72 also includes an inverter 80 and an access road 82. As an example, the inverter 80 may be a structure such as a block house, a shipping container, or other structure configured to house equipment for coupling electric power generated by the solar panels 72 to an electric grid (not shown). In the example of FIG. 3, the inverter 80 is demonstrated as being located proximal to a centroid of the solar panel block 72. As an example, location of the inverter 80 proximal to the centroid of the solar panel block 72 can provide for a better distribution of cables to the strings 76 to minimize the costs of cables, to provide for ease of installation and maintenance, and/or to more equally distribute current loads. The access road 82 is demonstrated as passing through the entirety of the solar panel block 72, such that additional identical solar panel blocks can be adjacently installed to allow the access road 82 to continue in a contiguous uninterrupted road in a straight line through each of the identical solar panel blocks in a given row or column of solar panel blocks of the array in the respective solar farm. The access road 82 is demonstrated in the example of FIG. 3 as passing through an approximate center of the solar panel block 72 to facilitate access to the inverter 80 to aid in installation and maintenance, and thus divides the solar panel strings 76 in the respective solar panel block 72. Based on the access road 82 passing through each of the solar panel blocks in the row or column in a contiguous straight line, and based on the common location of the inverter 80 of each of the solar panel blocks in the given row or column, installation and maintenance costs of the solar farm can be significantly reduced, as described in greater detail herein. As an example, the electrical performance details of the inverter 80 can be stored as part of the power data 56, while the location of the inverter 80 and the access road 82 can be stored as part of the physical data 54 in the respective solar panel block type 52.

The solar panel block 72 is thus demonstrated as one example of a solar panel block. Therefore, the solar panel block library 50 can store a plurality of different solar panel block types 52 that can each differ with respect to one or more of the rectangular dimensions "X" and "Y", the number of solar panels 74 and/or strings 76, the location and/or characteristics of the inverter 80, and/or the location and/or orientation of the access road 82 relative to the solar panel block 72. As a result, the solar panel block 72 is one of several physical manifestations of respective separate designs of solar panel block types 52 stored in the solar panel block library 50 that can be accessed to design a solar farm, as described in greater detail herein.

Referring back to the example of FIG. 1, the solar farm design system 10 also includes a solar farm design controller 18. The solar farm design controller 18 can be implemented as a computer system, or as a software component that is resident on a computer system or accessible (e.g., via the Internet) via a computer system. The solar farm design controller 18 is configured to implement a design algorithm 20 to generate a solar farm design 22 that can be stored in the memory system 12. The design algorithm 20 can be configured to receive the geographic map data 14 and can access the solar panel block library 16, and can be configured to optimize the solar farm design 22 based on minimal user inputted information. As described in greater detail herein, the design algorithm 20 can include a three-stage iterative process to generate the solar farm design 22 based on the geographic map data 14 and the solar panel block types stored in the solar panel block library 16. Upon generation of the solar farm design 22, the solar farm design 22 can be accessed from the memory system 12 to facilitate installation of a corresponding solar farm in the geographic region corresponding to the geographic map data 14. The operation of the design algorithm 20 is demonstrated in greater detail in the following examples of FIGS. 3-10.

Figure 4:
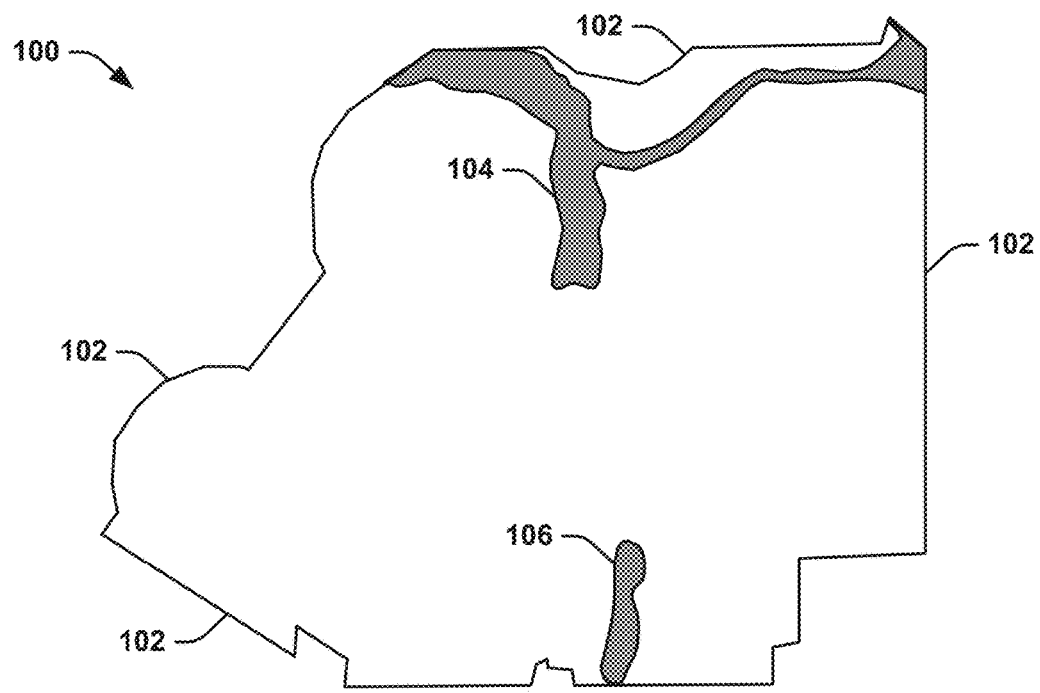
FIG. 4 illustrates an example diagram of a map of a geographic region.

FIG. 4 illustrates an example of a map 100 of a geographic region. The map 100 includes defined boundaries 102. The boundaries 102 can correspond to one or more property borders, and can thus enclose the geographic region to define the allowable parcel of land on which to install the solar farm. The map 100 also includes a first body of water 104, demonstrated as a portion of a river or creek, and a second body of water 106, demonstrated as a pond. As an example, the boundaries 102 and the bodies of water 104 and 106 can be defined by the geographic map data 14. The remaining area of the map 100 can correspond to acceptable locations for installation of solar panels. Thus, the solar farm design controller 18 is configured to initially access the geographic map data 14 from the memory system 12 as a first step in implementing the design algorithm 20.

The solar farm design controller 18 is further configured to access a first of the solar panel block types (e.g., one of the solar panel block types 52 in the example of FIG. 2) from the solar panel block library 16. The design algorithm 20 can thus generate an array of virtual solar panel blocks that can be superimposed on the map 100 of the geographic region as part of a first stage of the three-stage iterative process.

Figure 5:
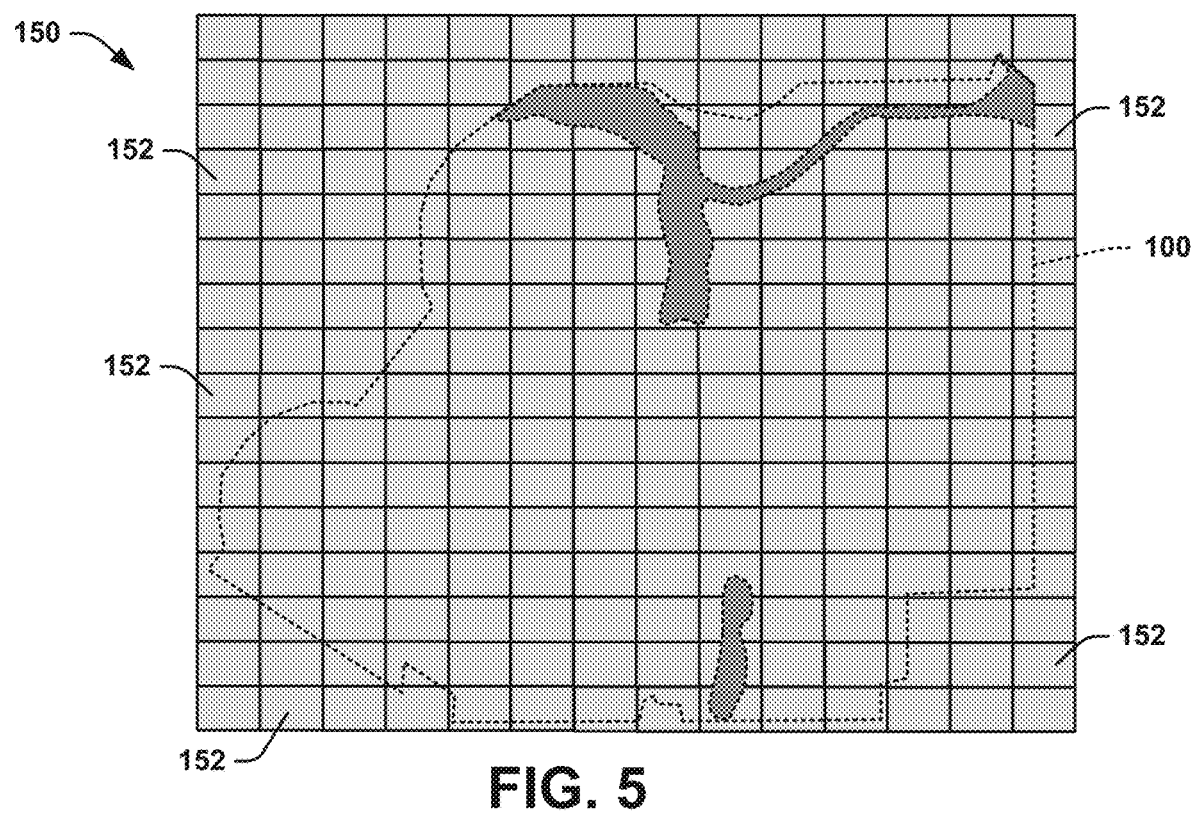
FIG. 5 illustrates a first example diagram of a step of a solar farm design algorithm.

FIG. 5 illustrates a first example diagram 150 of a step of the design algorithm 20. The step in the diagram 150 can correspond to a first part of the first stage of the three-stage iterative process. In the example of FIG. 5, the design algorithm 20 generates an array of virtual solar panel blocks 152. Each of the solar panel blocks 152 can be selected as a single one of the solar panel block types 52, such that the respective one of the solar panel block types 52 is replicated in rows and columns of the array in a contiguous manner. As an example, the array can have enough rows and columns to substantially cover the entirety of the map 100. Thus, in the example of FIG. 5, the design algorithm 20 superimposes the array of virtual solar panel blocks 152 over the map 100. After superimposing the array of the virtual solar panel blocks 152 over the map 100, the design algorithm 20 can shift the array of the virtual solar panel blocks 152 in each of two orthogonal dimensions to substantially maximize the number of the solar panel blocks 152 that do not intersect the boundaries 102 or the bodies of water 104 and 106.

Figure 6:
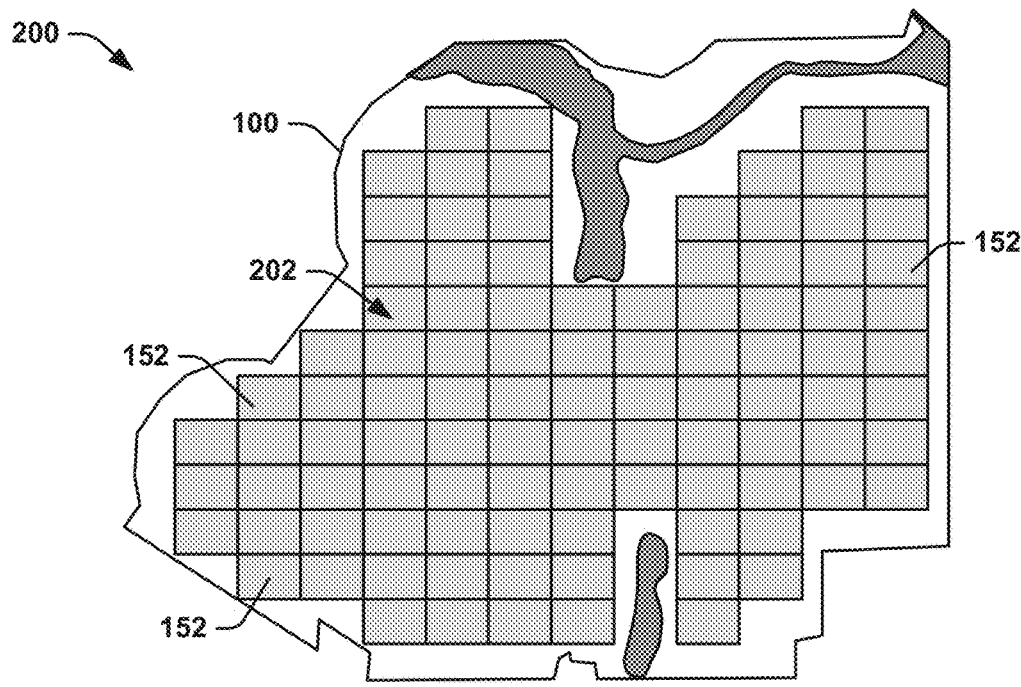
FIG. 6 illustrates a first example diagram of a solar panel block layout of a solar farm design algorithm.

FIG. 6 illustrates a first example diagram 200 of a solar panel block layout of the design algorithm 20. In response to the design algorithm 20 shifting the array of the virtual solar panel blocks 152 in two orthogonal dimensions to maximize the number of virtual solar panel blocks 152 that are non-intersecting of the boundaries 102 or of the bodies of water 104 and 106, the design algorithm 20 can remove the virtual solar panel blocks 152 that intersect the boundaries 102 or of the bodies of water 104 and 106. As a result, the remaining virtual solar panel blocks 152 are arranged in a manner that fit in a contiguous arrangement as a non-intersecting array 202 within the boundaries 102 and the bodies of water 104. As a result, and as described in greater detail herein, the resulting non-intersecting array 202 of virtual solar panel blocks 152 can be arranged as a non-contiguous array based on the removal of the intersecting virtual solar panel blocks 152.

As described previously, the solar farm design controller 18 is further configured to access one the solar panel block types (e.g., one of the solar panel block types 52 in the example of FIG. 2) from the solar panel block library 16 to generate the array of virtual solar panel blocks. Upon generating the non-intersecting array 202, such as demonstrated in the example of FIG. 6, the design algorithm 20 can calculate a total output power, such as from the power data 56, and can calculate a total installation and maintenance cost, such as from the installation data 58, associated with the non-intersecting array 202. Thus, the design algorithm 20 can determine a total output power relative to the total installation and maintenance cost associated with the non-intersecting array 202. The design algorithm 20 can thus iteratively repeat the process of selecting a given one of the solar panel block types, generating an array, shifting the array in two orthogonal dimensions, and removing the intersecting virtual solar panel blocks to generate another non-intersecting array. Thus, the design algorithm 20 can iteratively determine a total output power relative to a total installation and maintenance cost associated with each of the non-intersecting arrays to optimize the solar farm design 22.

Figure 7:
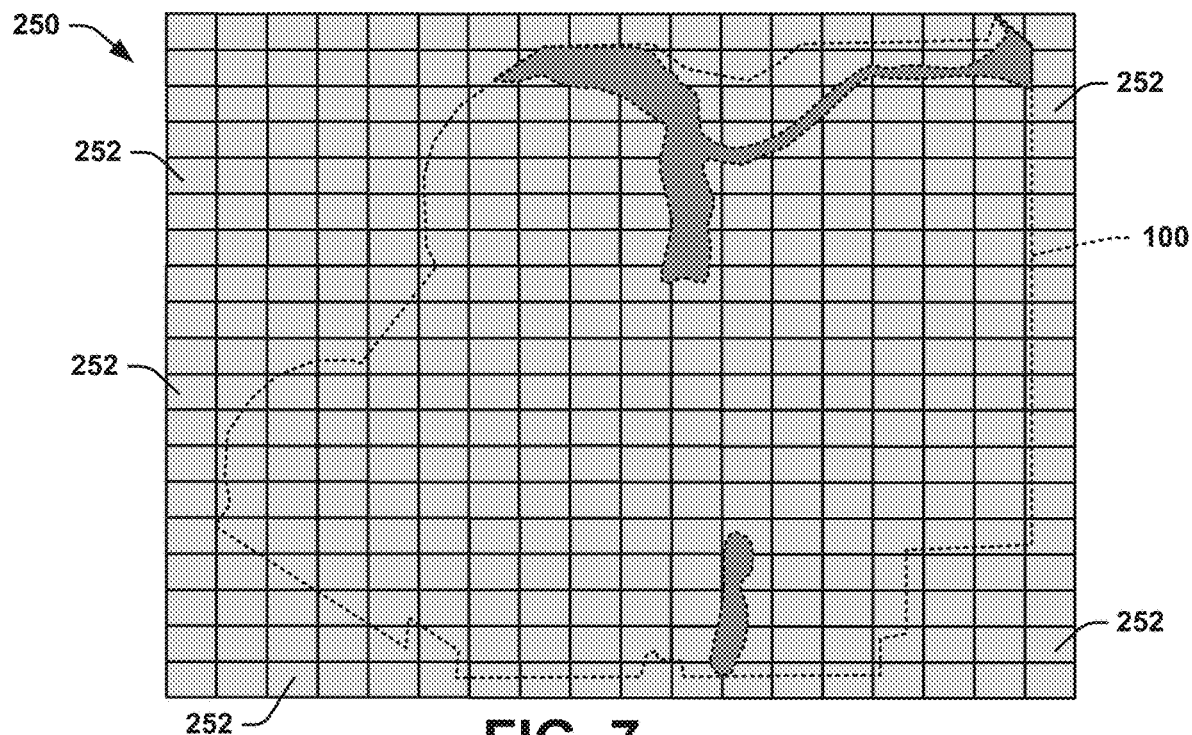
FIG. 7 illustrates a second example diagram of a step of a solar farm design algorithm.

FIG. 7 illustrates a second example diagram 250 of a step of the design algorithm 20. The step in the diagram 250 can correspond to another example of a first part of the first stage of the three-stage iterative process. In the example of FIG. 7, the design algorithm 20 generates an array of virtual solar panel blocks 252. Each of the solar panel blocks 252 can be selected as a next one of the solar panel block types 52 relative to the first solar panel block type that was selected in the example of FIG. 5. In the example of FIG. 7, the selected solar panel block type 52 is demonstrated as having different two-dimensional dimensions relative to the first solar panel block type 52 in the example of FIG. 5, and can thus have different characteristics (e.g., with respect to physical data 54, power data 56, and installation data 58) relative to the first solar panel block type 52. Therefore, the virtual solar panel blocks 252 can correspond to a second of the plurality of solar panel block types selected for the first stage of the three-stage process of the design algorithm 20, such that additional other solar panel block types can subsequently be iteratively selected and evaluated, similar to the solar panel block types selected for the virtual solar panel blocks 152 in the examples of FIGS. 4 and 5 and the virtual solar panel blocks 252 in the examples of FIGS. 6 and 7, as described herein.

In the example of FIG. 7, the respective next one of the solar panel block types 52 is replicated in rows and columns of the array in a contiguous manner. As an example, the array can have enough rows and columns to substantially cover the entirety of the map 100. Thus, in the example of FIG. 7, the design algorithm 20 superimposes the array of virtual solar panel blocks 252 over the map 100. After superimposing the array of the virtual solar panel blocks 252 over the map 100, the design algorithm 20 can shift the array of the virtual solar panel blocks 252 in each of two orthogonal dimensions, similar to as described in the example of FIG. 5, to substantially maximize the number of the solar panel blocks 252 that do not intersect the boundaries 102 or the bodies of water 104 and 106.

Figure 8:
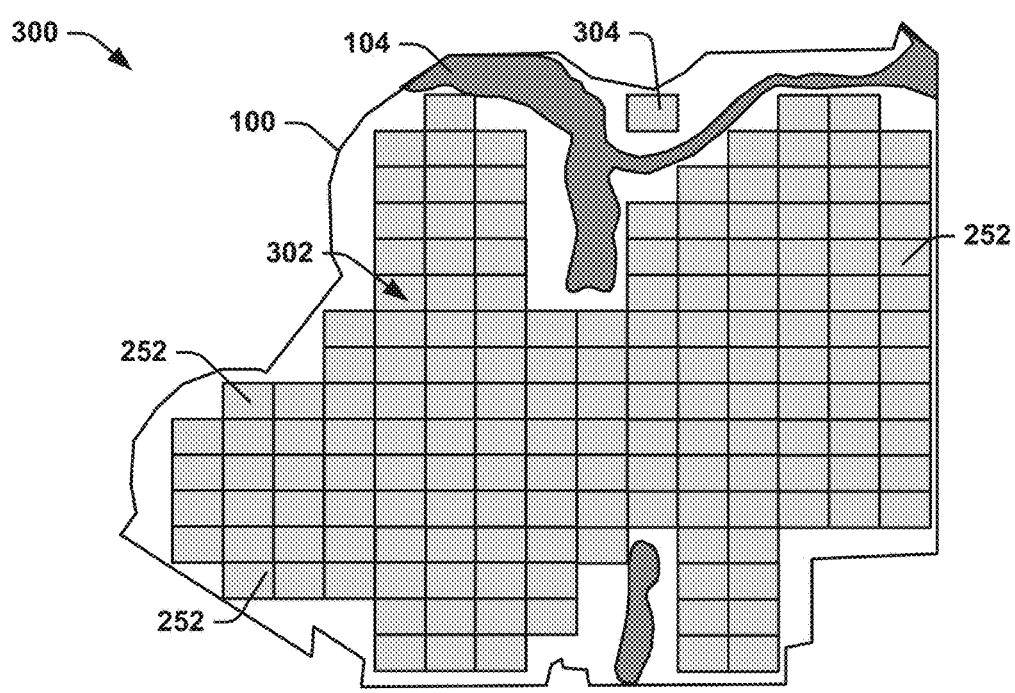
FIG. 8 illustrates a second example diagram of a solar panel block layout of a solar farm design algorithm.

FIG. 8 illustrates a second example diagram 300 of a solar panel block layout of the design algorithm 20. In response to the design algorithm 20 shifting the array of the virtual solar panel blocks 252 in two orthogonal dimensions to maximize the number of virtual solar panel blocks 252 that are non-intersecting of the boundaries 102 or of the bodies of water 104 and 106, the design algorithm 20 can remove the virtual solar panel blocks 252 that intersect the boundaries 102 or of the bodies of water 104 and 106, similar to as described in the example of FIG. 6. As a result, the remaining virtual solar panel blocks 252 are arranged in a manner that fit in a contiguous arrangement as a non-intersecting array 302 within the boundaries 102 and the bodies of water 104. While the non-intersecting array 302 is described previously as being contiguous, it is to be understood that portions of the non-intersecting array 302 can be separate from other portions to provide a non-contiguous non-intersecting array 302, as demonstrated by the example of the virtual solar panel block 304 demonstrated as north of the body of water 104. Thus, the virtual solar panel blocks can be superimposed on the map 100 between any of the boundaries and geographic features to substantially maximize the coverage of the map 100. Similar to as described previously in the example of FIG. 8, the design algorithm 20 can determine a total output power relative to the total installation and maintenance cost associated with the non-intersecting array 302. The solar farm design algorithm 20 can thus optimize the solar farm design 22 for individual, contiguous geographic site boundaries, for multiple geographic site boundaries, and/or for individual, separate, or all boundaries simultaneously.

Upon determining a total output power relative to the total installation and maintenance cost associated with the non-intersecting arrays corresponding to each of the respective solar panel block types 52, the design algorithm 20 can select the most optimal of the solar panel block types 52 for the solar farm design 22 to best fit a predetermined criterion. For example, using other user-defined inputs, such as energy cost, along with the determined total output power relative to the total installation costs provides the ability to evaluate long-term financial performance during implementation of the solar plant design algorithm 20. As an example, the predetermined criterion can correspond to a ratio of power relative to cost, such that optimization of the solar panel block types 52 can be based on the one of the solar panel block types 52 having a highest ratio of total output power to installation and maintenance cost or any other derived criteria for financial optimization or power performance. For example, the selected solar panel block type 52, and thus the corresponding non-intersecting array of virtual solar panel blocks, can be saved as the solar farm design 22, such that the solar farm can be installed at the geographic region of interest based on the solar farm design 22, and thus based solely on the first stage of the exemplary three-stage iterative process of the design algorithm 20. Alternatively, the design algorithm 20 can implement at least the second stage, and possibly also the third stage, of the exemplary three-stage iterative process to generate the solar farm design 22, as described in the following examples of FIGS. 8-10.

Figure 9:
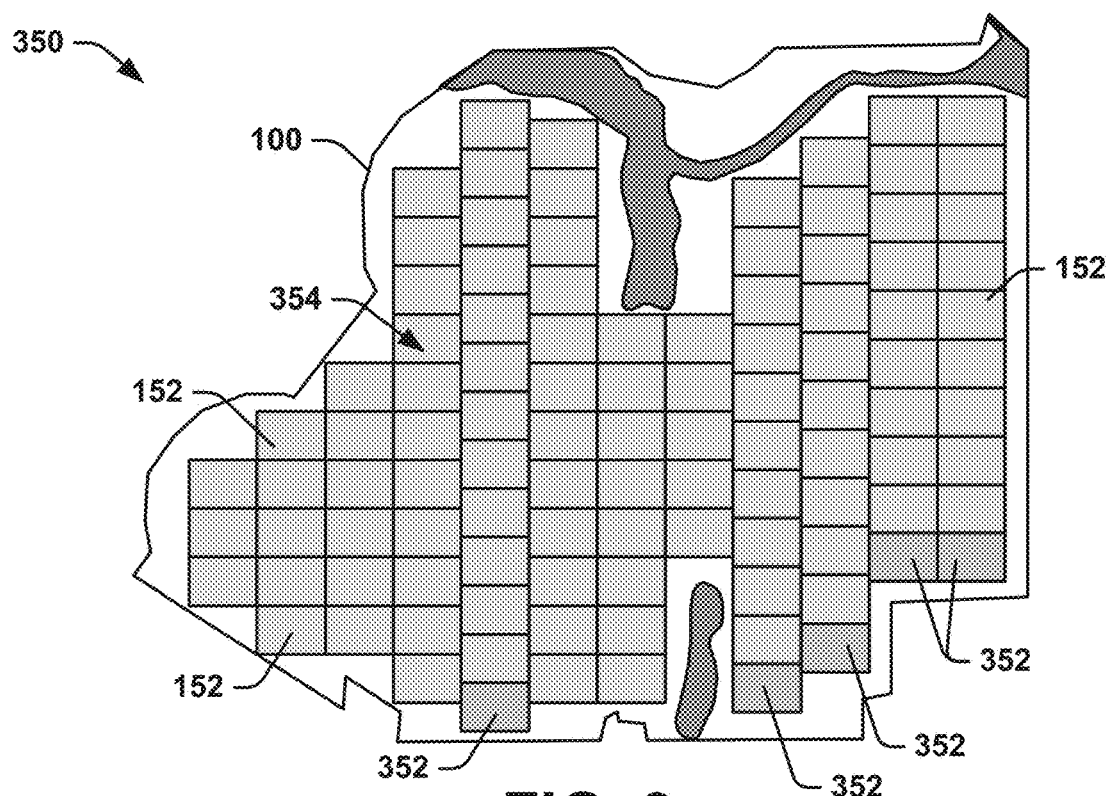
FIG. 9 illustrates another example diagram of a step of a solar farm design algorithm.

FIG. 9 illustrates another example diagram 350 of a step of the design algorithm 20. The step in the diagram 350 can correspond to the second stage of the three-stage iterative process. In the example of FIG. 9, the diagram 350 demonstrates the non-intersecting array 202 in the example of FIG. 6, such as based on the design algorithm 20 selecting the non-intersecting array 202 as the non-intersecting array of a respective one of the solar panel block types 52 as having the highest ratio of output power to installation and maintenance cost. To implement the second stage of the three-stage iterative process, the design algorithm 20 iteratively selects each row or each column of the non-intersecting array of the virtual solar panel blocks and shifts the selected row or column along one orthogonal direction (plus or minus along the respective axis) to determine if there is sufficient space on the map to add an additional solar panel block to the respective row or column without additional intersection of the virtual solar panel blocks with the boundaries or geographic features. If the design algorithm 20 determines that there is additional space on the map after the shift, the design algorithm will add an additional virtual solar panel block at an end of the row or column after the shift to substantially maximize the land area of the map that is covered by the virtual solar panel blocks, and thus the amount of the geographic region that is covered by corresponding solar panel blocks.

In the example of FIG. 9, the design algorithm 20 iteratively steps through each of the columns of virtual solar panel blocks of the non-intersecting array 202. At each column, the design algorithm 20 shifts the column of virtual solar panel blocks in the two axial directions that define the column (e.g., up and down) to determine if another virtual solar panel block can be added to the respective column. If the design algorithm 20 determines that there is sufficient space on the map 100 after the shift, the design algorithm 20 adds another virtual solar panel block 152 to the end of the respective column. The diagram 350 demonstrates the addition of five new virtual solar panel blocks 352 to the ends of respective shifted columns to provide a shifted array 354. If the design algorithm 20 determines that there is not sufficient space for the addition of a new virtual solar panel block 152, then the design algorithm 20 returns the respective column to its default position (e.g., prior to shifting), and iteratively continues to the next respective column. Accordingly, with the addition of the five new virtual solar panel blocks 352, the resultant shifted array 354 of virtual solar panel blocks covers more area of the map 100, and thus increases the output power of the solar farm design 22.

Figure 10:
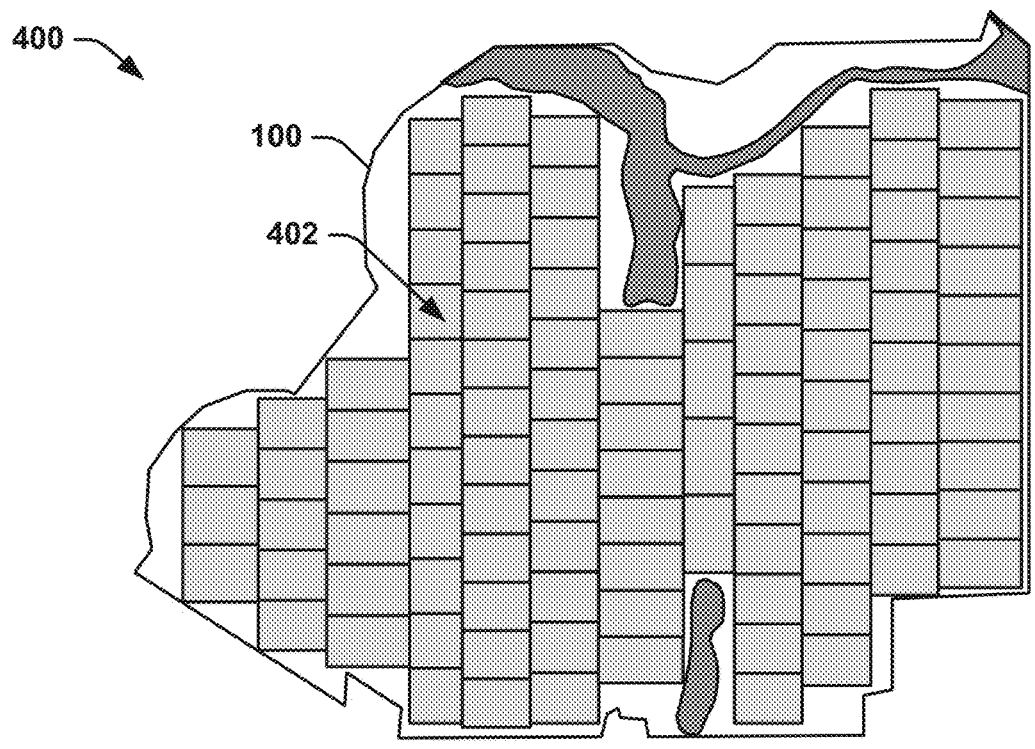
FIG. 10 illustrates yet another example diagram of a step of a solar farm design algorithm.

FIG. 10 illustrates yet another example diagram 400 of a step of the design algorithm 20. The step in the diagram 400 can correspond to the third stage of the three-stage iterative process. In the example of FIG. 10, the diagram 400 demonstrates the shifted array 354 in the example of FIG. 9, such as based on the design algorithm 20 implementing the second stage of the three-stage iterative process, as described previously. As an example, to implement the third stage of the three-stage iterative process, the design algorithm 20 iteratively selects each row or each column of the shifted array 354 of the virtual solar panel blocks and changes the dimensions of each of the virtual solar panel blocks in the selected row or column. Alternatively, the implementation of the third stage can be performed independently of the first stage and/or the second stage, as described previously.

The third stage of the three-stage iterative process of the design algorithm 20 provides for layout optimization that produces a layout of virtual solar panel blocks where the block shapes are the same within each row or within each column, but can be different from row to row or from column to column. For example, for layouts with east-west roads, the virtual solar panel blocks are the same within each row, and for layouts with north-south roads, the virtual solar panel blocks are the same within each column. As an example, a search algorithm can be used to determine an optimal layout. For example, in the case of east-west roads, the design algorithm 20 can implement the following steps:

1. Define a parameter keep that determines the number of partial layouts to keep at each step of the search. As an example, the third stage can define keep equal to twenty.

2. For each of ten different offsets from the southern edge of the map boundary and for each possible virtual solar panel block shape, pack as many virtual solar panel blocks into the first row as possible. Thus, if there are nine different virtual solar panel block shapes for the case of east-west roads, then ninety different versions of the first row are created.

3. For each of the ninety versions of the first row, calculate the fraction of the site area (up to the northern edge of the first row) that is covered by virtual solar panel blocks. Keep the twenty partial layouts (or whatever the value of keep is) with the highest fractional area coverage.

4. For each partial layout that was kept and for each possible virtual solar panel block shape, pack as many virtual solar panel blocks into the next row as possible. For the numbers in this example, there would then be 180 new partial layouts.

5. For each partial layout, calculate the fractional area coverage. Keep the twenty partial layouts (or whatever the value of keep is) with the highest fractional area coverage.

6. Repeat steps 4. and 5. until the northern edge of the map is reached.

7. From the set of complete layouts created by the search (which will generally be larger than keep, since complete layouts can have different numbers of rows depending on the north-south dimension of the rows used in the layout), pick the layout that fits the most virtual solar panel blocks onto the site. Note that this layout will not necessarily be the complete layout with the highest fractional area coverage, since the virtual solar panel block shapes have different areas.

As an example, the design algorithm 20 can be configured to select another one of the solar panel block types 52 from the solar panel block library 50 to replace each of the virtual solar panel blocks in the respective row or column. In this manner, the design algorithm 20 can determine whether replacing the previous virtual solar panel blocks in the respective row or column with virtual solar panel blocks of a different size, and thus of different power output and/or installation and maintenance costs, can result in a more optimal solar farm design 22. Replacing a given row or columns of virtual solar panel blocks with a different solar panel block type can result in shifting the remaining rows or columns to remain adjacent to the replaced row or column. As a result, if such a shift results in intersection of the remaining rows or columns with boundaries or geographic features of the map 100, then the design algorithm 20 can determine that either a different solar panel block type is needed for the respective row or column, or that the respective row or column cannot be changed. For example, the design algorithm 20 can determine that the respective row or column cannot be changed (e.g., replaced) with a different solar panel block type if no other solar panel block type increases the area of the map covered by the row or column, or if all of the other solar panel block types result in an intersection of the shifted remaining rows or columns with the respective boundaries or geographic features. Additionally, the design algorithm 20 can determine that such a replacement can result in a greater number of virtual solar panel blocks in the respective row or column, similar to as described in the example of FIG. 9.

In the example of FIG. 10, the design algorithm 20 iteratively steps through each of the columns of virtual solar panel blocks of the shifted array 354. At each column, the design algorithm 20 can iteratively evaluate each of the other solar panel block types 52 in the solar panel library 50 to determine if a respective column of a different one of the solar panel block types 52 covers more area of the map 100 than the solar panel block type 52 selected for the initial non-inverting array 202. If the design algorithm 20 determines that a different solar panel block type 52 can cover a greater amount of area of the map 100, then the design algorithm 20 can replace the virtual solar panel blocks of the respective column with a different solar panel block type. As a result, in the example of FIG. 10, several of the columns of the shifted array 354 are demonstrated as having dimensions that differ relative to each other. Accordingly, the design algorithm 20 can generate an optimized array 402 based on the replacement of the solar panel block types in the respective columns, with the optimized array 402 covering an even greater area of the map 100 than the shifted array 354, and thus further increasing the output power of the solar farm design 22. As an example, to achieve maximization of the land area of the map that is covered by the virtual solar panel blocks, the design algorithm 20 can be configured to implement at least two or three different solar panel block types in the given rows or columns of identical solar panel block types in the optimized array 402 to increase the output power associated with the respective solar farm.

Figure 11:
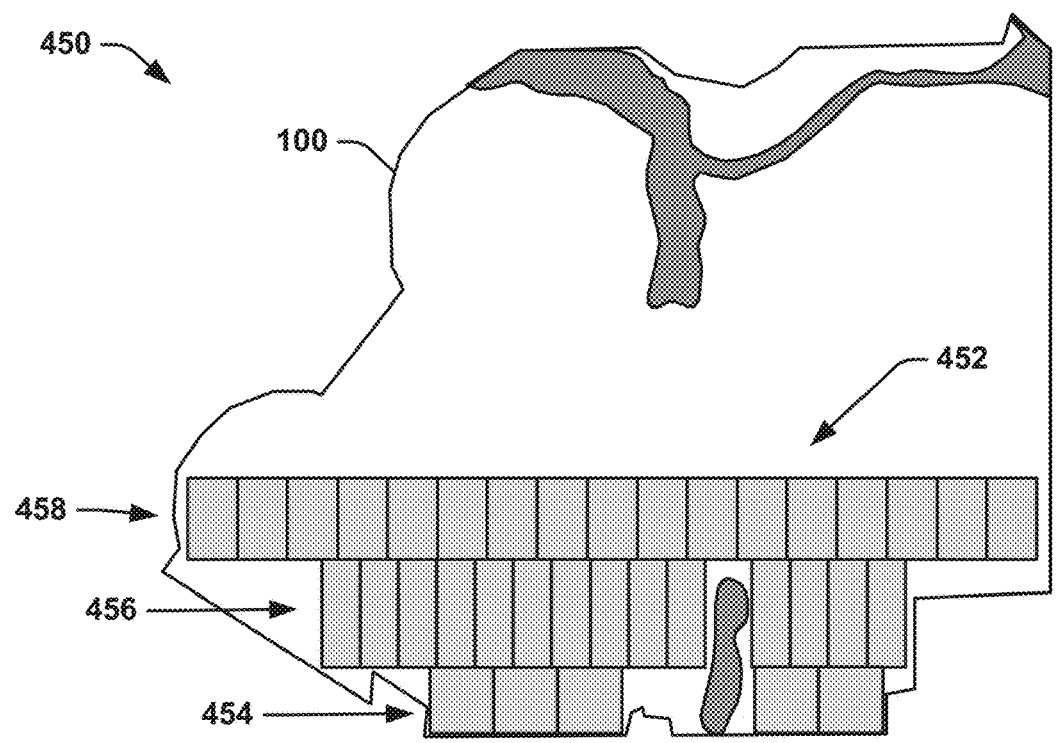
FIG. 11 illustrates yet a further example diagram of a step of a solar farm design algorithm.

FIG. 11 illustrates yet another example diagram 450 of a step of the design algorithm 20. The step in the diagram 450 can correspond to a stage of the design algorithm 20 in which the design algorithm 20 iteratively builds rows of virtual solar panel blocks, with each combination of connected rows to have the maximum number of virtual solar panel blocks. As an example, the step in the diagram 450 can iteratively build the virtual array 452, demonstrated as being in the process of being built in the example of FIG. 11, without either of the first or second steps of the iterative process having been performed (e.g., as described previously in the example of FIGS. 4-8).

As an example, the iterative process demonstrated in the diagram 450 can include the following steps:

1. For each of ten different offsets from the southern edge of the site boundary and for each possible virtual solar panel block shape, the design algorithm 20 packs as many virtual solar panel blocks into the first row, demonstrated at 454, as possible (while avoiding boundaries and geographic features like the lake 106). Thus, if there are nine different virtual solar panel block shapes for the case of east-west roads, then ninety different versions of the first row 454 are created.

2. For each of the ninety versions of the first row 454, the design algorithm 20 calculates the fraction of the map area (e.g., up to the northern edge of the first row 454) that is covered by virtual solar panel blocks. The design algorithm 20 can keep the twenty partial layouts (or whatever the value of the variable keep is) with the highest fractional area coverage.

3. For each partial layout that was kept and for each possible virtual solar panel block shape, the design algorithm 20 can pack as many blocks into the next row, demonstrated at 456 and 458 for respective next rows, as possible. In this example, there would then be 180 new partial layouts.

4. For each partial layout, the design algorithm 20 can calculate the fractional area coverage. The design algorithm 20 can keep the twenty partial layouts (or whatever the value of keep is) with the highest fractional area coverage.

Accordingly, the design algorithm 20 can be configured to iteratively build the optimized array 452 in a row-wise or column-wise manner based on rows or columns of identical virtual solar panel block types. Thus, the diagram 450 in the example of FIG. 11 provides an alternative to implementation of the three iterative stages as described previously in the examples of FIGS. 4-9. As a result, the iterative design process of the design algorithm 20 is not limited to implementing the three-stage iterative process.

In the example of FIGS. 9 and 10, the optimized arrays 402 and 452 are demonstrated such that each of the columns of the optimized array 402 and the rows of the array 452 are comprised of a single one solar panel block type 52, and are thus aligned with respect to the respective dimension (width in the example of the optimized array 402, or length in the example of a row-wise iterative process). As described previously, each of the solar panel block types 52 includes data regarding a location of an access road that passes through the respective solar panel block type 52 that can facilitate access to a corresponding solar panel block for installation and maintenance of the solar panel block. The access road can extend through the solar panel block type 52, and thus each of the corresponding virtual solar panel blocks, along a given one direction that can correspond to either a column-wise or row-wise extension. Accordingly, by implementing the design algorithm 20 iteratively in either a row-wise or column-wise manner, the access road of each of the virtual solar panel blocks can be aligned along the respective row or column, and can have a common location of an inverter in each of the virtual solar panel blocks. As a result, the respective solar panel blocks can likewise have aligned access roads and common inverter locations for ease in real-world installation and maintenance of the solar panel blocks, and thus the solar farm to substantially reduce costs associated with installing and maintaining the solar farm.

Figure 12:
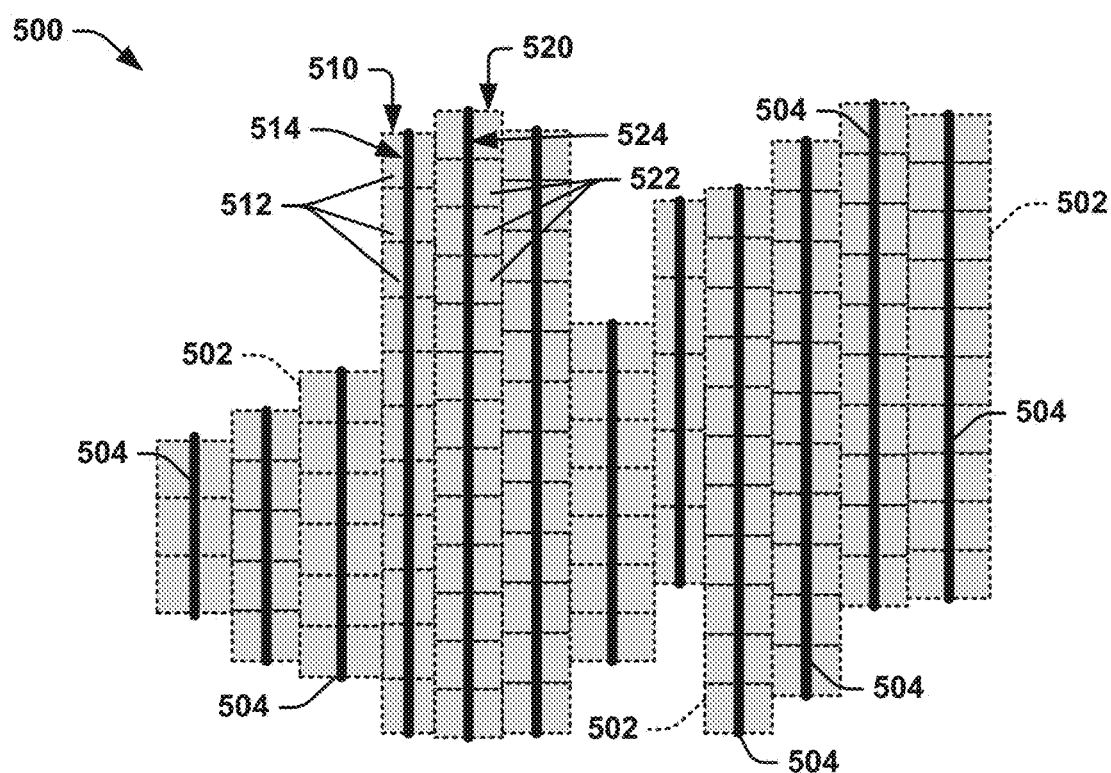
FIG. 12 illustrates an example diagram of access roads in a solar farm design.

FIG. 12 illustrates an example diagram 500 of access roads in a solar farm design. The diagram 500 demonstrates virtual solar panel blocks 502 that formed the optimized array 402 of the example of FIG. 10, and thus demonstrates the optimized array 402 absent the map 100 over which it is superimposed. The diagram 500 also demonstrates the access roads 504 that extend along each of the columns of the optimized array 402. Because each of the virtual solar panel blocks 502 in a given column of the optimized array 402 is formed from the same solar panel block type 52, the location of the access roads 504 are the same in each of the virtual solar panel blocks 502 of a given column. Therefore, the access roads 504 extend in a straight line through the entirety of each of the columns of the optimized array 402. Accordingly, by implementing the second stage and the third stage of the three-stage iterative process, as described in the examples of FIGS. 8 and 9, in a row-wise or column-wise manner, the resultant optimized array 402 can maintain straight access roads 504 through each of the respective rows or columns for ease in installation and maintenance, and thus in a more cost conservative manner. Accordingly, the design algorithm 20 operates to substantially maximize output power of the solar farm design 22 while substantially minimizing the costs associated with installation and maintenance of the solar farm design 22, and thus the resultant solar farm.

In addition to consistent placement of roads that provide accessibility to panels and inverter equipment, a location of one or more inverters is also placed in the appropriate position within the virtual solar panel blocks. The position of the respective inverter depends largely on the inverter virtual solar panel block type from the solar panel block library 16 as well as the final output of the solar design algorithm 20. For example, an inverter with output of n megawatts and from a given manufacturer can connect thousands of solar panels and can require an inverter skid enclosure size of respective predetermined dimensions. Such information can likewise be included in the respective entry for a virtual solar panel block type 52 in the solar panel block library 50.

The optimized algorithm 402 can thus be stored as the solar farm design 22 in the memory system 12. Accordingly, the solar farm design 22 can be accessed from the memory system 12 for installation (e.g., building) a resultant solar farm on the geographic region associated with the geographic map data 14. As a result, the design algorithm 20 provides an automated manner of designing a solar farm that provides considerations for both output power and for the costs associated with both installation and maintenance. The design algorithm 20 can thus be implemented to generate the solar farm design 22 in an extremely rapid manner, as opposed to manually and/or arbitrarily designating portions of a given geographic region on which the solar farm is to be built to include solar panels, inverters, access roads, and other components of the associated solar farm, with such designation having likewise arbitrary consideration for installation and maintenance costs and time. Accordingly, the solar farm design system 10 can generate a more cost-effective, power optimized solar farm design 22 in much more timely manner relative to typical solar farm design systems that rely on computer assisted drafting (CAD) tools for manual and custom design.

It is to be understood that the examples of FIGS. 3-11 with respect to the implementation of the design algorithm 20 are provided by example. Therefore, the steps and order of operation of the design algorithm 20 are not limited to as described in the example of FIGS. 3-11. For example, the design algorithm 20 can be configured to only implement the first and second stages (e.g., as described in the examples of FIGS. 3-8), the first and third stages (e.g., as described in the examples of FIGS. 3-7 and 9), or just the third stage (e.g., as described in FIG. 11). As another example, the design algorithm 20 can implement the stages in reverse order, such as by building rows or columns based on selecting solar panel block types 52, similar to as described in the example of FIG. 10, then shifting each of the rows or columns, as described in the example of FIG. 9, then shifting the entire built array. Another example would be running a subset of the three stage design algorithm 20 as an initial sizing or filtering tool to quickly determine if available land can support a desired solar farm size. Accordingly, the design algorithm 20 is not limited to as described in the examples of FIGS. 3-11.

Looking in combination to the subject matter of the figures including FIG. 5 and FIG. 12, what is described is a solar farm (e.g., FIG. 12) coupled to an electric grid (not shown), the solar farm including a plurality of non-identical parallel columns 510 and 520, or in the alternative rows, with each column having a multiplicity of identical rectangular solar panel blocks 512 and 522. Each solar panel block 70 includes a multiplicity of solar panels 72, an access road segment 82 having two sides and traversing through the solar panel block, wherein at least a portion of both sides of the access road segment are adjacent to a portion of the multiplicity of solar panels, and an inverter 80 coupled to the multiplicity of solar panels and the electric grid. The inverter has a multiplicity of sides, in this example the inverter has four sides, wherein one of the multiplicity of sides is located adjacent to the access road segment and the remaining of the multiplicity of sides are located adjacent a portion of the multiplicity of solar panels. Each of the solar panel blocks of a first column 510 of the parallel columns have a first rectangular shape, and each of the solar panel blocks of a second column 520 of the parallel columns have a second rectangular shape different from the first rectangular shape. In the example of FIG. 12, the first rectangular shape has a width greater than the length and the second rectangular shape has a length greater than the width. In other examples either the length or the width or both may differ between the first and second rectangular shapes. The first column may be adjacent to the second column. In the example of FIG. 12, the first column consists essentially of the solar panel blocks of the first rectangular shape, and the second column consists essentially of the solar panel blocks of the second rectangular shape. In other examples, the column may include additional solar panels (not shown) that are not identical to solar panel blocks of the column. Any implementation of additional solar panel blocks may be based on the geography of the wind farm, the power output, construction cost, and/or maintenance costs of the wind farm. The first column 510 includes a straight first access road 514 oriented parallel to the plurality columns and comprised of the road segments 82 of the solar panel blocks 512 of the first column. The second column 520 includes a straight second access road 524 oriented parallel to the plurality of columns and comprised of the road segments 82 of the solar panel blocks 522 of the second column. The solar panel blocks of the plurality of non-identical parallel columns may be selected to optimize one or more criteria associated with the solar farm including power output to the electric grid, solar farm installation costs, and solar farm maintenance costs. In other examples, not all columns of the solar farm need have non-identical columns, and the several of the plurality of columns may have identical solar panel blocks and differing lengths while still being considered identical columns for the purpose of this description.

In view of the foregoing structural and functional features described above, methods in accordance with various aspects of the present disclosure will be better appreciated with reference to FIG. 13. While, for purposes of simplicity of explanation, the method of FIG. 13 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 13 illustrates a method 550 for generating a solar farm design (e.g., the solar farm design 22). At 552, geographic map data (e.g., the geographic map data 14) comprising a map (e.g., the map 100) that defines geographic features and boundaries of a geographic region on which a solar farm is to be installed based on the solar farm design is received. At 554, a solar panel block library (e.g., the solar panel block library 16) that is configured to store a plurality of virtual solar panel block types (e.g., the solar panel block types 52) is accessed. Each of the plurality of virtual solar panel block types corresponds to a design of a respective solar panel block comprising a plurality of solar panels, an inverter, and an access road (e.g., the access roads 504). Each of the plurality of virtual solar panel block types includes predetermined dimensions (e.g., defined by the physical data 54) and a predefined output power rating (e.g., defined by the power data 56). At 556, an array (e.g., the array 202) of virtual solar panel blocks comprising at least one of the plurality of virtual solar panel block types is generated to fit within the geographic features and boundaries of the geographic region on the map based on the predetermined dimensions of each of the virtual solar panel blocks in the array. At 558, the array is iteratively modified to substantially optimize a predetermined criterion (e.g., including the output power and/or the installation and maintenance costs) of the solar farm design. At 560, the solar farm design is stored in a memory (e.g., the memory system 12) for installation of the solar farm based on the solar farm design.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A solar farm system installed on a geographic region and coupled to an electric grid, the solar farm comprising a plurality of non-identical parallel rows or columns, each row or column comprising a multiplicity of identical rectangular solar panel blocks, each solar panel block comprising:
    a multiplicity of solar panels;
    an access road segment comprising two opposing sides and traversing through the respective solar panel block wherein at least a portion of each opposing side of the access road segment is adjacent to a respective portion of the multiplicity of solar panels; and
    an inverter coupled to the multiplicity of solar panels and the electric grid, the inverter comprising a multiplicity of sides, wherein one of the multiplicity of sides is located adjacent to the access road segment and the remaining of the multiplicity of sides are located adjacent a respective portion of the multiplicity of solar panels;
    wherein each of the solar panel blocks of a first row or a first column of the parallel rows comprises a first rectangular shape, and wherein each of the solar panel blocks of a second row or a second column of the parallel rows or columns, respectively, comprises a second rectangular shape different from the first rectangular shape.

2. The solar farm system of claim 1, wherein the first row or column is adjacent to the second row or column, wherein the first row or first column consists essentially of the solar panel blocks of the first rectangular shape, and the second row or second column consists essentially of the solar panel blocks of the second rectangular shape.

3. The solar farm system of claim 1, wherein the first row or first column includes a straight first access road oriented parallel to the plurality of rows or plurality of columns and comprised of access road segments of the solar panel blocks of the first row or the first column, and the second row or second column includes a straight second access road oriented parallel to the plurality of rows or plurality of columns and comprised of the road segments of the solar panel blocks of the second row or the second column.

4. The solar farm system of claim 3, wherein the first access road is juxtaposed to each inverter in the first row or the first column.

5. The solar farm of claim 4, wherein each inverter is positioned proximal to a centroid of a respective solar panel block.

6. The solar farm system of claim 1, wherein the solar panel blocks of the plurality of non-identical parallel rows or columns are selected to optimize one or more criteria associated with the solar farm comprising at least one of power output to the electric grid, solar farm installation costs, and solar farm maintenance costs.

7. A solar farm installed on a geographic region and coupled to an electric grid, the solar farm comprising:
   a plurality of sets of solar panel blocks arranged in parallel, each set of solar panel blocks being arranged to form a rectangular shape, wherein each set of solar panel blocks has an access road traversing through the respective set of solar panel blocks;
   each solar panel block of each set of solar panel blocks comprising:
      a plurality of solar panels; and
      an inverter coupled to each solar panel of the plurality of solar panels of the respective solar panel block and the electric grid, wherein the inverter is accessible via an associated access road of a respective set of solar panel blocks;
   wherein the rectangular shape formed by a first set of solar panel blocks of the plurality of sets of solar panel blocks is different from the rectangular shape formed by a second set of solar panel blocks of the plurality of sets of solar panel blocks.

8. The solar farm of claim 7, wherein the rectangular shape formed by the first set of solar panel blocks differs from the rectangular shape formed by the second set of solar panel blocks in two dimensions.

9. The solar farm of claim 7, wherein the plurality of sets of solar panel blocks are arranged within boundaries defined in the geographic region and the geographic region comprises at least one of a rock formation and a body of water.

10. The solar farm of claim 9, wherein the plurality of sets of solar panels blocks are arranged to substantially fill an area within the boundaries of the geographic region excluding an area corresponding to the at least one of the rock formation and the body of water.

11. The solar farm of claim 7, wherein each access road of a respective set of solar panel blocks provides a linear path.

12. The solar farm of claim 11, wherein each inverter of a respective solar panel block is positioned proximal to a centroid of the respective solar panel block.

13. A method for generating a solar farm design, the method comprising:
   receiving, by a solar farm design system executing on a computer, geographic map data comprising a map that defines geographic features and boundaries of a geographic region on which a solar farm is to be installed;
   generating, by the solar farm design system, an array of virtual solar panel blocks comprising a subset of a plurality of virtual solar panel block types to fit within the geographic features and boundaries of the geographic region, wherein each of the plurality of virtual solar panel block types corresponds to a design of a respective solar panel block comprising a plurality of solar panels, an inverter and an access road, and each of the plurality of virtual solar panel block types comprises precomputed dimensions and a predefined output power rating;
   iteratively modifying, by the solar farm design system, the array to substantially optimize a predetermined criterion of the solar farm design to generate the solar farm design for installation, wherein iteratively modifying the array comprises:
      superimposing a respective one of the plurality of arrays over the map.

14. The method of claim 13, wherein each of the plurality of virtual solar panel block types comprises data associated with the predetermined maintenance and installation costs, wherein iteratively modifying the array comprises substantially optimizing predetermined criteria associated with a respective predefined output power rating of each of the virtual solar panel blocks in the array relative to the predetermined maintenance and installation costs associated with each of the virtual solar panel blocks in the array.

15. The method of claim 14, wherein iteratively modifying the array comprises determining a highest ratio of output power rating to predetermined maintenance and installation costs associated with the solar farm design.

16. The method of claim 13, wherein iteratively modifying the array comprises adjusting at least one of axial position and relative dimension of each virtual solar panel block equally in at least one row or at least one column of the array to maximize a quantity of virtual solar panel blocks of the array on the map.

17. The method of claim 13, wherein iteratively modifying the array comprises maintaining alignment of the access road of each solar panel block corresponding to each of the virtual solar panel blocks in each row or each column.

18. The method of claim 13, wherein iteratively modifying the array further comprises:
   iteratively selecting each of the plurality of virtual solar panel block types to generate each of a respective one of a plurality of arrays; and
   iteratively shifting the respective one of the plurality of arrays in two dimensions over the map to maximize a quantity of the virtual solar panel blocks of the respective one of the plurality of arrays that do not intersect with the geographic features and boundaries of the geographic region on the map.

19. The method of claim 18, wherein iteratively modifying the array further comprises:
   determining the output power rating of the solar farm design based on the predefined output power rating of each of the non-intersecting virtual solar panel blocks in each of the plurality of arrays; and
   comparing the output power rating of each of the plurality of arrays to select a given one of the plurality of arrays for the solar farm design.

20. The method of claim 13, wherein the geographic features of the map data comprises at least one of a rock formation and a body of water within the boundaries of the map.

* * * * *